US012000185B2

(12) United States Patent
Schiffer

(10) Patent No.: US 12,000,185 B2
(45) Date of Patent: Jun. 4, 2024

(54) LOCKING DEVICE FOR A MOTOR VEHICLE BONNET

(71) Applicant: Kiekert AG, Heiligenhaus (DE)

(72) Inventor: Holger Schiffer, Meerbusch (DE)

(73) Assignee: Kiekert AG, Heiligenhaus (DE)

( * ) Notice: Subject to any disclaimer, the term of this patent is extended or adjusted under 35 U.S.C. 154(b) by 43 days.

(21) Appl. No.: 16/094,486

(22) PCT Filed: Mar. 24, 2017

(86) PCT No.: PCT/DE2017/100243
§ 371 (c)(1),
(2) Date: Jan. 17, 2019

(87) PCT Pub. No.: WO2017/182026
PCT Pub. Date: Oct. 26, 2017

(65) Prior Publication Data

US 2024/0035316 A1 Feb. 1, 2024

(30) Foreign Application Priority Data

Apr. 18, 2016 (DE) ..................... 10 2016 107 128.5
Apr. 22, 2016 (DE) ..................... 10 2016 107 512.4

(51) Int. Cl.
*E05B 83/24* (2014.01)
*E05B 17/00* (2006.01)
*E05B 77/08* (2014.01)

(52) U.S. Cl.
CPC .......... *E05B 83/24* (2013.01); *E05B 17/0062* (2013.01); *E05B 77/08* (2013.01)

(58) Field of Classification Search
CPC ...... E05B 17/00; E05B 17/0062; E05B 77/00; E05B 77/02; E05B 77/08; E05B 83/00;
(Continued)

(56) References Cited

U.S. PATENT DOCUMENTS

2012/0074715 A1* 3/2012 Kim ........................ E05B 77/08 292/201
2013/0221685 A1* 8/2013 Polewarczyk ........ E05B 83/243 292/52
(Continued)

FOREIGN PATENT DOCUMENTS

DE 10318796 4/2008
DE 102011114148 3/2013
(Continued)

OTHER PUBLICATIONS

International Search Report and Written Opinion for corresponding Patent Application No. PCT/DE2017/100243 dated Jun. 19, 2017.

*Primary Examiner* — Nathan Cumar
(74) *Attorney, Agent, or Firm* — Renner, Otto, Boisselle & Sklar, LLP

(57) ABSTRACT

A locking device for a motor vehicle bonnet, wherein the locking device comprises a locking mechanism with a rotary latch and a pawl for locking the rotary latch in a main latching position. Wherein the locking device also comprises a catch hook which can define an opening movement of a lock retainer in a secure position which is between an intended closed position and an intended open position after opening the locking mechanism, wherein the catch hook comprises a load dependent barrier, and the locking device is designed such that a movement of the lock retainer in the direction of the barrier is defined by the barrier dependent on the load in the intended locked position, such that the lock retainer only goes in further than the intended closed position when there is an overload. A further developed locking device with pedestrian protection can also be provided.

20 Claims, 1 Drawing Sheet

Figure 1:
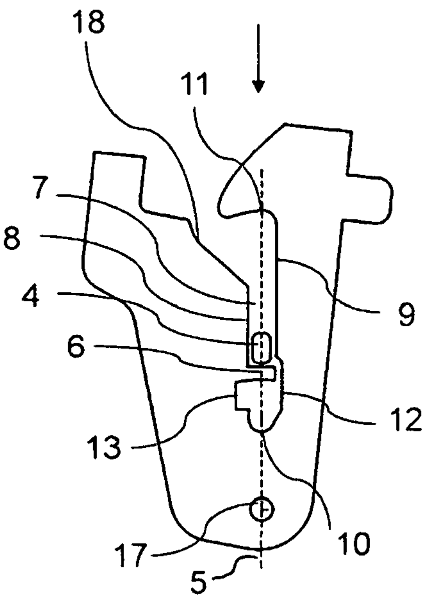

(58) Field of Classification Search
CPC ........ E05B 83/16; E05B 83/24; E05B 83/243; E05B 83/247
USPC ........................................................ 70/240
See application file for complete search history.

(56) References Cited

U.S. PATENT DOCUMENTS

| | | | | |
|---|---|---|---|---|
| 2014/0159386 | A1* | 6/2014 | Faruque | E05B 83/24 292/196 |
| 2015/0115625 | A1* | 4/2015 | Park | E05B 83/24 292/194 |

FOREIGN PATENT DOCUMENTS

| | | | |
|---|---|---|---|
| DE | 102014001945 | | 8/2014 |
| EP | 1172507 | | 8/2005 |
| EP | 2481645 | A1 | 8/2012 |
| KR | 20100006257 | | 1/2010 |

* cited by examiner

LOCKING DEVICE FOR A MOTOR VEHICLE BONNET

The invention relates to a locking device for a motor vehicle bonnet according to the generic term of the main claim.

Personal accidents between a motor vehicle and a pedestrian generally cause severe injuries to the pedestrian, in particular when the pedestrian impacts the motor bonnet.

Publications DE 10318796 B4, DE 102011114148 A1, EP 2481645 A1 and KR 20100006257 A disclose motor bonnet locks with pedestrian impact protection.

However, the known solutions are very sophisticated and require additional components.

An object of the invention is therefore to provide a further developed locking device for a motor vehicle bonnet.

A locking device according to the main claim solves the object. Advantageous embodiments result from the subclaims. The aforementioned features known from the state of the art can be combined individually or in any combination with one of the objects according to the invention described hereafter.

The object is solved by a locking device for a motor vehicle bonnet, wherein the locking device comprises a locking mechanism with a rotary latch and a pawl for locking the rotary latch in a main latching position. Wherein the locking device also comprises a catch hook which can define an opening movement of a striker after opening of the locking mechanism in a secure position which is between an intended closed position and an intended open position.

The catch hook has a load dependent barrier and the locking device is designed such that a movement of the striker is limited in a load dependent manner in the direction of the barrier on the intended closed position by the barrier so that the striker only submerges beyond the intended closed position in the case of an overload.

The fact that the striker can only submerge beyond the intended closed position in the case of an overload relates to both a closure process of the motor bonnet as a pedestrian accident in operation with an already closed motor bonnet and a ratcheted locking mechanism, wherein a load is transferred to the striker by means of the pedestrian impacting on the motor bonnet.

Simultaneously, the movement of the striker in the direction of the barrier (marked with an arrow in the figures), which is limited on the intended closed position by the barrier both the closure process of the motor bonnet and also normal operation with an already closed motor bonnet and a ratcheted locking mechanism. Because also in normal operation, sometimes due to different causes, loads below a threshold load, i.e. no overload, are transmitted via the motor bonnet onto the striker and are accommodated or absorbed by the barrier, i.e. do not lead to submersion of the striker.

In the main latching position of the rotary latch, the rotary latch is ratcheted by the pawl so that rotation of the rotary latch to release the arrested striker can be prevented in principle.

The intended open position generally enables inspection and/or the making accessible of the motor. In the intended open position, the motor bonnet is raised at a distance to the motor vehicle chassis which enables a person to inspect and/or have the motor made accessible to them.

The intended closed position is assumed to operate the motor vehicle. The motor bonnet aligns with the visible external side in the intended closed position with the adjacent motor vehicle chassis. In the intended closed position on the inside, the motor bonnet generally has a determined distance to the adjacent motor vehicle chassis so that the motor bonnet can move without the closure device via the intended closed position in the direction of the motor vehicle chassis and could open onto the motor vehicle chassis, if necessary.

The secure position generally has a distance from the intended closed position in the direction of the intended open position, i.e. in the direction of an opening movement so that a hand can only be inserted flatly from the outside between the motor bonnet and the motor vehicle chassis. Only flat means that the hand surface is oriented parallel to the motor bonnet and/or a transversely held hand cannot be inserted between the motor bonnet and the motor vehicle chassis.

The striker executes a closure movement during closure of the motor bonnet, i.e. a movement in the direction of the barrier, starting from the intended open position in the direction of the intended closed position. In principle, the closure movement or movement in the direction of the barrier runs along a defined and/or guided movement track, wherein the pivot bearing, in particular the motor bonnet, generally acts as such a guide.

A pedestrian accident in which the pedestrian impacts the motor bonnet also leads to a force on the striker to execute the movement in the direction of the barrier or closure movement along the movement track.

An opening movement and a closure movement or a movement in the direction of the barrier are opposite movements, i.e. movements into the opposite direction along the same movement track. The opening movement and closure movement or movement in the direction of the barrier are both a relative movement between the striker and the closure device in principle. Because the striker can be attached both to the motor bonnet and also to the adjacent motor vehicle chassis in a closed position or vice versa. The locking device can be attached accordingly both to the motor vehicle chassis or the motor bonnet.

During a normal closure process, the motor bonnet is dropped with its deadweight and/or slight additional force from the raised open position and/or accelerated in the closure movement direction or in the direction of the barrier.

In the normal closure process, the striker is limited in its movement in the direction of the barrier or the closure movement on the intended closed position by the barrier by the striker preferably opening the barrier.

Limiting in a position means that when the striker attains the position during execution of a movement into a movement direction, the movement of the striker is stopped, i.e. limited, in this movement direction. Typically, a movement is limited by a stop. This relates in particular to the opening movement and movement in the direction of the barrier or closure movement and their limitation on an intended open position, secure position and/or closed position.

An excessive load is present in the case of a pedestrian crash, for example, in which the pedestrian impacts on the motor bonnet. However, the excessive load can also be produced by misuse, for example, in which a user closes the motor bonnet with particularly great force, i.e. moves with great speed in the direction of the barrier or the direction of the closure movement.

Load means a force which the striker exerts in the case of movement in the direction of the barrier or a closure movement on the load dependent barrier.

Excessive load means a force above a threshold load, i.e. a threshold value for a force. Due to the known correlation of mass, acceleration and force the threshold load can also describe threshold acceleration if the mass of the motor bonnet is known and otherwise no additional weight, e.g. an impacting pedestrian in the case of a pedestrian crash is connected to the motor bonnet.

Submersion beyond the intended closure position means that the movement of the striker in the direction of the barrier, i.e. the closure movement of the striker, continues beyond the intended closed position.

Submersion means a closure movement in the closure movement direction or a movement of the striker in the direction of the barrier starting on the intended closure position.

In the case of excessive load, the striker impacts or presses on the barrier with a force above the threshold load so that the threshold load is exceeded. The movement of the striker in the direction of the barrier is then continued in particular uniformly along the movement track.

By means of a locking device encompassing a catch hook with a load dependent barrier which enables a closure movement of the striker or a movement of the striker to be limited in a load dependent manner in the direction of the barrier on the intended closed position by the barrier so that the striker only submerges beyond the intended closed position in the case of an overload, especially effective pedestrian protection is enabled. Because the yielding of the motor bonnet caused hereby can reduce injuries to a pedestrian in the case of impact on the motor bonnet.

As the load dependent barrier is assigned to the catch hook, a locking device with pedestrian protection can be provided with especially low manufacturing cost and without or at least with an especially low number of additional components. An especially cost-effective and compact locking device with the additional function of pedestrian safeguarding can thus be maintained.

Hereafter, the invention is explained in further detail on the basis of exemplary embodiments illustrated diagrammatically in the figures and in relation to the figures the embodiments and additional advantageous embodiments are described in further detail.

The following are shown:

FIG. 1: Locking device with a striker in the closed position

Figure 2:
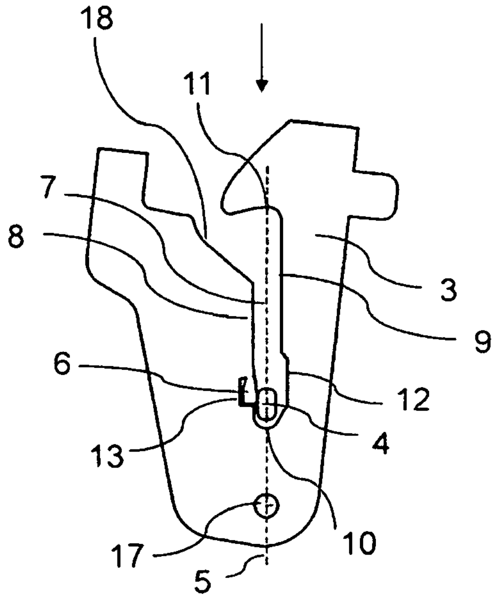

FIG. 2: Locking device after submersion of the striker

Figure 3:
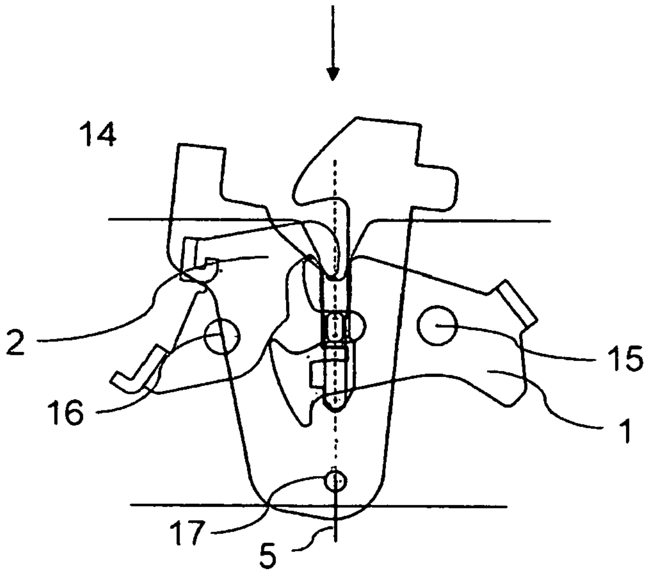

FIG. 3: Locking device with illustrated locking mechanism in the main latching position FIGS. 1 to 3 show an exemplary embodiment of a locking device according to the invention. In FIGS. 1 and 2 the rotary latch 1 and the pawl 2 are superimposed. FIG. 3 shows FIG. 1 with a superimposed rotary latch 1 and pawl 2 in the main latching position and the lock plate 14, i.e. a plate to attach the rotary latch 1 and the pawl 2, preferably with a lock plate inlet slot which is also apparent in FIG. 3. The redundant reference signs with FIG. 1 were omitted for improved clarity of FIG. 3. The reference signs in FIG. 1 therefore also apply to the relevant components in FIG. 3.

The rotary latch 1 is pivotably accommodated around the rotary latch axis 15. The rotary latch 1 is pre-tensioned in the clockwise direction in particular by a rotary latch spring which is not illustrated.

The pawl 2 is pivotably accommodated around the pawl axis 16. The pawl 2 is pre-tensioned in the clockwise direction in particular by a pawl spring which is not illustrated.

The catch hook 3 is pivotably accommodated around the catch hook axis 17. The catch hook 3 is pre-tensioned in particular by a catch hook spring which is not illustrated in an anti-clockwise direction.

In particular, the catch hook 3 has a hook shape, preferably in the shape of a "1". The upper bevel acts as a pivot as a result of an impacting and gliding striker during a closure movement. On the opposite side of the bevel, the v-shaped depression acts as a securing stop for the striker after leaving the locking mechanism.

In particular, the hook shape constitutes one of two legs connected in a U-shape, wherein the guide groove 7 runs between both legs. Preferably, the trough of the guide groove 7 therefore forms a submersion stop in the region of the base of the leg connected in a U-shape to limit the movement of the striker in the direction of the barrier or the closure movement of the striker in the case of overload.

In one embodiment, the barrier 6 and the catch hook 3 are executed as a single component and/or the barrier 6 is connected in a firmly bonded and/or immobile manner with a basic body of the catch hook 3.

Single-component means produced from a material component, e.g. from a single piece of sheet metal stamped out together as a coherent component.

A firmly bonded barrier can be welded, soldered or affixed on.

A barrier connected in an immobile manner with a basic body has no degree of freedom of movement relative to the basic body. An immobile connection can be produced by an interlocking and/or force-fitting connection, such as a clip connection, for example.

All alternatives of this embodiment have the advantage that a reliable load dependent limitation of the movement of the striker can be attained in the direction of the barrier or the closure movement of the striker on the intended closed position during a scheduled closure process, i.e. with no overload.

In one embodiment, the barrier 6 is designed such that the barrier 6 does not plastically deform in the case of overload, especially in the region of a bending axis.

By means of provision of a barrier 6 which plastically deforms in the case of overload, a sophisticated mechanism can only be saved to permit submersion of the striker in the case of overload and thus the number of necessary components are reduced for the additional function of pedestrian protection.

In a further embodiment, the barrier 6 is designed such that the barrier 6 breaks or is deformed for bending in the case of overload on a pre-determined breaking point.

A pre-determined breaking point is generally an area with a tapered cross-section on which the greatest material tensions occur during stress by the striker so that the barrier 6 fails first at this point, i.e. at the pre-determined breaking point, i.e. plastically deforms or breaks.

The bending and/or breakage site can thus be determined with particular precision.

In one embodiment, the locking device is thus designed such that during an overload the barrier 6 is bent over by the striker 4, preferably around the bending axis, in particular by at least 85° or 90°, preferably in a closure movement direction, so that the striker 4 can submerge beyond the intended closed position.

Bending over means a bending over or bending off of the bending axis so that the barrier 6 pivots around the bending axis. In particular, plastic deformation therefore occurs on the bending axis or in the area of the bending axis. The bending axis is preferably executed as a pre-determined breaking point.

During impacting of the striker 4 on the barrier 6 the highest material tensions occur on the bending axis, in particular by means of the lever arm between the bending axis and the contact point of the striker 4 on the barrier 6. In the case of a scheduled closure process, forces and moments occur below the stretching limit of the material in the region of the bending axis. The barrier 6 therefore withstands the stress by the impacting striker 4. However, in the case of overload the stretching limit is exceeded in the area of the bending axis so that the material starts to flow and plastically deforms there.

In particular, the collecting arm 3, the barrier 6 and/or a material for firmly bonded connection made of metal or, more rarely but definitely possible, of plastic. A firmly bonded connecting material is only present in the case of an embodiment of the catch hook 3 which is not formed of a single component.

The threshold load thus correlates with the stretching limit of the material in the region of the bending axis, the material thickness in this region and the lever arm.

In one embodiment, the locking device is designed such that the movement of the striker 4 is limited in the direction of the barrier in the case of overload on a submersion position by a submersion stop 10 of the catch hook 3.

Additional components can be saved by means of the submersion stop 10 integrated in the catch hook. In addition, the submersion stop 10 enables a reproducible submersion with a defined submersion path. Damage to the motor bonnet by collision with the adjacent vehicle chassis can thus be prevented.

In a further embodiment, the barrier is integrated in the catch hook in order to attain the aforementioned advantages.

The submersion path, i.e. the distance between the submersion position and the intended closed position is at least 10 mm, preferably 14 mm, and/or a maximum of 20 mm, preferably a maximum of 16 mm. Effective pedestrian protection can thus be attained.

In particular, the submersion stop 10 is formed as a U-shape in order to offer a secure hold for the striker 4.

The submersion stop 10 is preferably outside of the range of a bending barrier 6, in order to always attain the intended submersion position and does not reach the barrier in an uncontrolled manner between the submersion stop 10 and the striker.

In one embodiment, the catch hook 3 has a guide groove 7 to guide the striker 4 to the barrier 6 and/or to the submersion stop 10 in the case of its movement in the direction of the barrier and/or the guide groove 7 of the catch hook 3 extends to the barrier 6 and/or to the submersion stop 10.

In principle, the inlet of the guide groove 7 is on the opposite side from the submersion stop 10 and/or the catch hook rotational axis 17. Because the striker can reach into the guide groove 19 in the movement in the direction of the barrier by pivoting of the catch hook 3 which is described in more precise detail hereafter.

By means of the guide groove, it can be ensured that the striker impacts on the barrier 6 and does not move past the barrier 6, for example, during closure, for example by means of unscheduled pivoting of the catch hook 3.

In one embodiment, a first lateral wall 8 and/or a second lateral wall 9 of the guide groove 7 are oriented parallel to a movement track 5 of the striker 4 between the secure position and the intended closed position, in particular in the region of the guide groove 7 directly in front of the barrier 6 in the closure movement direction. This enables reliable guidance of the striker to the barrier 6. The inlet of the guide groove 7 is preferably triangular, preferably with an accommodation bevel 18, wherein only one of the two lateral walls, in particular the first lateral wall 8, extends at an angle to the region directly in front of the barrier 6 in which both lateral walls 8, 9 are oriented parallel to one another.

As also in the other embodiments, the case of a catch hook 3 is meant here, which was not pivoted by a striker 4 impacting from above, but assumes the starting position which is also present, for example, if the locking mechanism is located in the main latching position. The case as shown in FIGS. 1 to 3 is therefore meant.

In particular, the barrier 6 is fundamentally arranged horizontally and/or vertically centrally on the catch hook 3.

In one embodiment, the first lateral wall 8 and/or the second lateral wall 9 of the guide groove 7 are oriented orthogonally to the barrier 6. A reliable limitation of the movement of the striker 4 in the direction of the barrier 6 or the closure movement of the striker can thus be attained during a scheduled closure process. In addition, bending over during exceeding of a load threshold value can thus be executed with particular simplicity.

What is meant here, as also for the remaining embodiments with a right-angled arrangement of the guide groove 7 to the barrier 6, is the case of a non-plastically deformed barrier 6 in the operationally ready state.

In one embodiment, the first lateral wall 8 together with the barrier 6 forms an L-shape, in particular as a single component, preferably with a right angle.

The bending axis is then arranged in the corner of the L-shape and enables pivoting as for a barrier.

In one embodiment, the second lateral wall 9 has a gap or distance from the barrier 6 and/or the second lateral wall 9 has a recess 12 to produce the distance to the barrier 6 in the region of the barrier 6. This is especially easily recognizable in FIG. 1.

Gap means such a small distance so that no contact can reliably take place.

By means of the gap or distance, a bracing of the barrier is effectively prevented on the second lateral wall.

In particular, the length of the barrier is identical to the width of the guide groove 7 without a recess 12. The barrier 6 can thus block the entire guide groove 7, in particular a barrier, without coming into contact with the opposite wall. The recess 12 preferably extends to the submersion stop 10.

Especially reliable pivoting of the barrier in the case of overload can thus be enabled.

In one embodiment, the barrier 6 blocks at least 50%, preferably at least 70%, of particular preference at least 90% of the guide groove 7, in order to limit the movement of the striker in the direction of the barrier or the closure movement of the striker.

Blocking means blockage of a passage provided by the guide groove 7.

The extension of the barrier 6 transversely to the lengthwise extension of the guide groove 7, i.e. in the closure movement direction or in the direction of the barrier is therefore at least 50%, preferably at least 70%, of particular preference at least 90% of the width of the guide groove 7 in the region in front of the barrier 6 without taking into account the recess 12.

Especially effective limitation of the striker 4 during a scheduled closure process can thus be enabled.

In one embodiment, the guide groove 7 or the first lateral wall 8 of the guide groove provides an indentation 13 to accommodate the plastically deformed and/or bent over barrier 6.

The barrier 6 can thus, after a plastic deformation and/or bending off, not block the passage produced by the guide groove 7 between the intended closed position and the submersion position or, in the worst case, jam or wedge the striker between the intended closed position and the submersion position or in the worst case jam or wedge the striker so that it can no longer be removed or can only be removed from the guide groove 7 with difficulty.

In particular, the indentation 13 has at least the volume and the dimensions of the barrier 6. The volume and the dimensions are preferably 10 to 20% larger. This is recognizable in FIG. 2.

In one embodiment, the barrier 6 comprises a protrusion or is a protrusion and/or precisely one or two barriers 6 are provided for.

A protrusion enables especially simple execution of a load dependent barrier 6. The bending axis is then precisely arranged on the interface of the protrusion to the basic body of the catch hook 2. An especially designed pre-determined breaking point can be saved as the lever arm precisely determines the bending axis locally in the case of a protrusion in the area of the interface.

The provision of precisely one barrier 6 has the advantage that the mechanism of the load dependent limitation operates in a very error-robust manner in practice. Two barriers 6, e.g. of both lateral walls separated from one another in the center of the guide groove 7 by a gap as for a double folding door have the advantage that as a result of the smaller lever arm with the same dimensions of the barrier a greater load threshold can be provided.

In one embodiment, the protrusion is at least twice or three times as long as thick and/or a maximum of eight times or five times as long as thick. Long means in the non-plastically deformed state transversely to the guide groove 7. Thick means orthogonally to the length in the plane of the flat surface of the catch hook 4.

Especially reliable pivoting around the bending axis can thus be enabled.

In one embodiment, the barrier 6 can be formed as a consistent rail. The rail extends as a single component from the first lateral wall 8 to the second lateral wall 9 and is connected on both sides. In particular, the barrier 6 can be connected in a right angle to the respective lateral wall. The barrier 6 can thus extend over the entire width of the guide groove 7.

Connected means that the barrier is welded, soldered or affixed to the lateral walls or can be formed as a single component with the catch hook 3.

In a further embodiment, the consistently formed rail has a pre-determined breaking point, in particular a pre-determined breaking point formed as a bending axis.

The bending axis is then arranged centrally by the rail and enables pivoting in the case of overload. The striker would then impact vertically on the bending axis during the closure process and, in the case of overload, lead to plastic deformation and/or breakage of the barrier.

In FIGS. 1 to 3, a top view of the flat surface of the catch hook 3 is shown in a starting position.

In one embodiment, the closure device is designed such that in the main latching position of the rotary latch 1 the striker 4 is located in the intended closed position. Reliable ratcheting of the locking mechanism can thus be attained in the intended closed position. Reliable prevention of unscheduled opening of the motor bonnet can thus be enabled.

In particular, the locking mechanism is designed such that the pawl 2 during overload and submersion of the striker 4 despite pivoting of the rotary latch 1 remains or is held in its position, e.g. by a holding means so that the rotary latch 1 ratchets again with the pawl 2 during pivoting back.

Alternatively, joint rotation of the pawl 2 with the rotary latch 1 pivoting as a result of submersion of the striker 4 can be provided for with maintenance of the ratcheting.

Hereafter, an opening process, a scheduled closure process and a closure process in the case of overload are described as an example.

Normally, a triggering lever is provided for on the motor vehicle chassis which can be triggered by means of a Bowden cable or similar which is covered by the motor bonnet, which can detach the pawl from the ratcheted position with the rotary latch located in the main latching position.

During operation of the triggering lever for opening of the closure device and thus the motor bonnet the striker 4 which is preferably attached on the underside of the motor bonnet is released. In addition, the motor bonnet or the striker is displaced by an opening spring from the triggered locking mechanism in the direction of the open position. This opening movement is initially limited by the securing stop 11 of the catch hook 3.

The user can now reach under the motor bonnet with the flat hand in order to operate a pivoting lever for the catch hook 3 which pivots the catch hook 3 against the catch hook spring force in a clockwise direction so that the striker 4 is no longer limited by the securing stop 11 in the movement track 5, at least as long as the catch hook 3 remains pivoted against the catch hook spring force.

The opening spring presses the striker 4 only slightly in the direction of the intended open position, straight enough so that after release of the catch hook 3 the striker 4 is hindered by the external bevel 13 of the catch hook 3 back into the secure position defined by the securing stop 11.

The user can now lift the motor bonnet automatically to the intended open position or the lifting occurs automatically. In particular, the intended open position is defined by a stopper or holding mechanism which enables the user sufficient space for convenient access and simple inspection of the motor.

To close, the user will detach the holding mechanism in the intended open position and the motor bonnet will either fall automatically due to gravity in the direction of the motor vehicle chassis and/or also regain a commutated force by the user.

The catch hook 3 is located by means of the catch hook spring force 3 again in the starting position (see FIGS. 1 to 3). The striker 4 will impact during falling or pivoting of the motor bonnet on the upper bevel—the bevel of the catch hook 3 is located below the arrow in the figures—and its closure movement along the movement track 5 will continue with displacement of the catch hook 3 in the clockwise direction. The striker 4 impacts on the accommodation bevel 18 by means of the pivoted position of the catch hook 3 and continues its closure movement along the movement track 5 with displacement of the catch hook 3 in an anti-clockwise direction.

The catch hook 3 thus moves back again into the starting position and the striker 4 is guided by means of the two parallel lateral walls 8, 9 loosely, i.e. with clearance, in the guide groove 7 on the way to the intended closed position, i.e. to the barrier 6. The catch hook 3 can no longer pivot during the process because the striker 4 prevents the catch hook 3 from pivoting by means of the lateral walls 8, 9 of the guide groove 7. The striker moves against the force of the opening spring. However, even the deadweight of the motor bonnet, if this is dropped from a certain distance to the motor vehicle chassis, is sufficient to overcome the opposing force of the opening spring.

After impacting of the striker 4 on the accommodation bevel 18 of the catch hook 3 the striker 4 is accommodated by the rotary latch 1, i.e. the striker 4 reaches into an inlet slot of the rotary latch 1, and pivots the rotary latch 1 in an anti-clockwise direction as a result of continuation of the closure movement along the movement track 5, in particular against the rotary latch spring force.

The striker 4 which is located both within the guide groove 7 of the catch hook 3 and also within the inlet slot of the rotary latch 1 impacts the barrier 6 in the intended closed position which is designed as a protrusion in particular in the exemplary embodiment shown. Simultaneously, the pawl 2 ratchets with the rotary latch 1 during attainment of the intended closed position which corresponds to the main latching position in the exemplary embodiment shown. The striker is now securely held by the locking mechanism so that also in the event of a lifting force on the motor bonnet the striker cannot be freed from the locking mechanism. This state is illustrated in FIG. 3.

If no excess load is present, the movement of the striker is stopped in the direction of the barrier or the closure movement by the barrier 6. In particular, elastic springing of the barrier 6 can occur hereby. However, no plastic deformation of the barrier 6 occurs. The barrier will therefore have the same or fundamentally the same shape, arrangement and orientation in the next closure process.

By means of ratcheting of the pawl 2 with the rotary latch 1 the opening spring can also no longer loosen the locking mechanism. The striker 4 therefore remains in the intended closed position, either with support on the barrier 6 or with a small air gap above.

Although the acceleration of the striker 4 is already reduced during a closure process as a result of friction on the external bevel and the accommodation bevel 18, i.e. the striker was decelerated. However, the load of the striker 4 can exceed the threshold load, i.e. an overload can be present as a result of acceleration and/or a force which additionally impacts on the striker, i.e. a force which attacks the motor bonnet in particular.

During operation of the motor vehicle, a pedestrian impacting on the motor bonnet can cause an overload of the striker 4 onto the barrier 6.

Both during the closure process and also in operation the force of the striker 4 exerted on the barrier 6 can lead to exceeding of the yield point of the material in the area of a bending axis which is located on the junction from the first lateral wall 8 and the barrier 6 designed as a protrusion.

The striker 4 can then continue its movement of the striker in the direction of the barrier or the closure movement along the movement track 5 and displace the barrier 6 by means of bending over in the closure movement direction, namely in particular 90°, preferably into the indentation 13, which accommodates the bent over, i.e. pivoted, barrier 6.

The guide groove 7 is thus barrier-free and the striker 4 can continue in an unimpeded manner the movement in the direction of the barrier or the closure movement to the submersion position along the movement track 5, where movement in the direction of the barrier or the closure movement of the striker 4 and thus the motor bonnet can finally be stopped in order to prevent damage to the motor bonnet as a result of an impact on the motor vehicle chassis.

In the case of a pedestrian collision, the severity of injury of the pedestrian as a result of the accident can be reduced by submersion of the striker 4.

In particular, the guide groove 7 is parallel or mirror-symmetrical to the movement track 5 in the starting position of the catch hook 3 or molded as a path between the catch hook axis 17 and the securing stop 11.

In particular, the barrier 6 crosses the movement track 5 in the operationally ready state in the starting position of the catch hook 3 or a path between the catch hook axis 17 and the securing stop 11.

In particular, a straight line formed by the movement track 5 runs in the starting position of the catch hook 3 by the catch hook axis 17.

In particular, the movement track 5 is located in the starting position of the catch hook 3 on a straight line between the catch hook axis 17 and the securing stop 11.

The invention claimed is:

1. A locking device for a motor vehicle bonnet, the locking device comprising:
- a locking mechanism with a rotary latch and a pawl for locking the rotary latch in a main latching position;
- a striker that is moveable between an intended closed position and an intended open position; and
- a catch hook which defines an opening movement and a closure movement of the striker to a secure position which is between the intended closed position and the intended open position,
- wherein the catch hook has a barrier which is load dependent and the closure movement of the striker is in a direction of the barrier and limited in a load dependent manner by the barrier when the striker is in the intended closed position, whereby the striker is configured to move to a submerged position beyond the intended closed position in response to an overload force, and
- wherein in response to the overload force, the barrier is bent over by the striker so that the striker moves toward the submerged position beyond the intended closed position.

2. The locking device according to claim 1, wherein the barrier and the catch hook are formed as a single component and/or the barrier is connected in a firmly-bonded and immobile manner with a basic body of the catch hook.

3. The locking device according to claim 1, wherein the barrier is configured to plastically deform in response to the overload force in an area of a bending axis.

4. The locking device according to claim 1, wherein the closure movement of the striker is limited in a direction of the barrier in response to the overload force by a submersion stop of the catch hook.

5. The locking device according to claim 4, further comprising a guide groove of the catch hook that extends to the barrier and/or to the submersion stop.

6. The locking device according to claim 5, wherein a first lateral wall and/or a second lateral wall of the guide groove are oriented parallel to a movement track of the striker between the secure position and the intended closed position.

7. The locking device according to claim 6, wherein the guide groove or the first lateral wall of the guide groove provides an indentation to accommodate the barrier when plastically deformed and/or bent over.

8. The locking device according to claim 5, wherein the first lateral wall and/or the second lateral wall of the guide groove are oriented orthogonally to the barrier.

9. The locking device according to claim 5, wherein the first lateral wall together with the barrier forms an L-shape as a single component.

10. The locking device according to claim 9, wherein the first lateral wall together with the barrier forms the L-shape as the single component with a right angle.

11. The locking device according to claim 5, wherein the second lateral wall has a gap or a distance to the barrier and/or the second lateral wall has a recess to produce the distance from the barrier in an area of the barrier.

12. The locking device according to claim 5, wherein the barrier blocks at least 50 of the guide groove in order to limit the closure movement of the striker in the direction of the barrier.

13. The locking device according to claim 5, wherein the barrier blocks at least 70% of the guide groove.

14. The locking device according to claim 13, wherein the barrier blocks at least 90% of the guide groove.

15. The locking device according to claim 1, wherein the barrier comprises a protrusion or is a protrusion, and/or one or two barriers are provided.

16. The locking device according to claim 15, wherein the protrusion is at least twice or three times as long as thick and/or is at most eight times or five times as long as thick.

17. The locking device according to claim 1, wherein the rotary latch is in the main latching position when the striker is located in the intended closed position.

18. The locking device according to claim 1, wherein the barrier is bent over by the striker by at least 85° or 90°.

19. A locking device for a motor vehicle bonnet, the locking device comprising:

a locking mechanism with a rotary latch and a pawl for locking the rotary latch in a main latching position;

a striker that is moveable between an intended closed position and an intended open position; and a catch hook which defines an opening movement and a closure movement of the striker to a secure position which is between the intended closed position and the intended open position, wherein the catch hook has a barrier which is load dependent and the closure movement of the striker is in a direction of the barrier and limited in a load dependent manner by the barrier when the striker is in the intended closed position, whereby the striker is configured to move to a submerged position beyond the intended closed position in response to an overload force, wherein the closure movement of the striker is limited in a direction of the barrier in response to the overload force by a submersion stop of the catch hook, further comprising a guide groove of the catch hook that extends to the barrier and/or to the submersion stop, wherein a first lateral wall and/or a second lateral wall of the guide groove are oriented parallel to a movement track of the striker between the secure position and the intended closed position, and wherein the guide groove or the first lateral wall of the guide groove provides an indentation to accommodate the barrier when plastically deformed and/or bent over.

20. A locking device for a motor vehicle bonnet, the locking device comprising:

a locking mechanism with a rotary latch and a pawl for locking the rotary latch in a main latching position;

a striker that is moveable between an intended closed position and an intended open position; and a catch hook which defines an opening movement and a closure movement of the striker to a secure position which is between the intended closed position and the intended open position, wherein the catch hook has a barrier which is load dependent and the closure movement of the striker is in a direction of the barrier and limited in a load dependent manner by the barrier when the striker is in the intended closed position, whereby the striker is configured to move to a submerged position beyond the intended closed position in response to an overload force, and wherein the barrier is configured to plastically deform in response to the overload force in an area of a bending axis.

* * * * *